(12) United States Patent
Yoshida

(10) Patent No.: US 7,583,453 B2
(45) Date of Patent: Sep. 1, 2009

(54) OPTICAL ELEMENT HOLDING STRUCTURE, EXPOSURE APPARATUS, AND DEVICE MANUFACTURING METHOD

(75) Inventor: Setsuo Yoshida, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/129,825

(22) Filed: May 30, 2008

(65) Prior Publication Data
US 2008/0310036 A1 Dec. 18, 2008

(30) Foreign Application Priority Data
Jun. 12, 2007 (JP) .............................. 2007-155726

(51) Int. Cl.
G02B 7/02 (2006.01)
(52) U.S. Cl. ....................... 359/811; 359/819
(58) Field of Classification Search ................. 359/811, 359/812, 819, 821, 822, 813
See application file for complete search history.

(56) References Cited

U.S. PATENT DOCUMENTS
2005/0002011 A1 1/2005 Sudoh
2006/0082907 A1 4/2006 Murasato
2006/0198036 A1 9/2006 Murasato
2007/0097354 A1 5/2007 Sudoh
2007/0121224 A1* 5/2007 Shibazaki ................... 359/813

FOREIGN PATENT DOCUMENTS
JP 2001-343576 A 12/2001

* cited by examiner

Primary Examiner—Timothy J Thompson
(74) Attorney, Agent, or Firm—Canon U.S.A., Inc., IP Division

(57) ABSTRACT

An optical element holding structure comprises a first holding member holding an optical element, a second holding member holding the first holding member, a third holding member holding the second holding member, first elastic members positioned between the first and second holding members and can elastically deform in the radial direction and second elastic members positioned between the second and third holding members in a radial direction thereof and can elastically deform in the radial direction, the plurality of first elastic members and the plurality of second elastic members are arranged in a circumferential direction about an optical axis of the optical element as the center, and a phase of the plurality of first elastic members is shifted from a phase of the plurality of second elastic members in the circumferential direction about the optical axis of the optical element as the center.

14 Claims, 4 Drawing Sheets

OPTICAL ELEMENT HOLDING STRUCTURE, EXPOSURE APPARATUS, AND DEVICE MANUFACTURING METHOD

BACKGROUND OF THE INVENTION

1. Field of the Invention

The present invention relates to an optical element holding structure, an exposure apparatus, and a device manufacturing method.

2. Description of the Related Art

An exposure apparatus transfers a circuit pattern formed on an original (reticle) onto a substrate (silicon wafer) by exposure. This transfer uses an optical system to image the reticle pattern on the wafer. The optical system is required to have a resolving power high enough to form a large-scale integrated circuit. This makes it necessary to minimize the optical aberration of the optical system for the exposure apparatus. In view of this, the optical system for the exposure apparatus must be excellent in the uniformity of various characteristics associated with the materials and films of optical elements such as a lens and mirror of the optical system, the processing accuracy of the optical surface shapes of the optical elements, and the assembly accuracy of the optical elements. A holding member for holding the optical element for use in the optical system is generally made of a material different from that of the optical element, such as a metal.

FIG. 6 shows a half of an optical element holding structure from the center of its optical surface, which is used for the conventional exposure apparatus.

Referring to FIG. 6, a plurality of lenses 101 and 102 are held by ring-like first holding members 103 and 104. The first holding members 103 and 104 are assembled in a cylindrical second holding member 105 and fixed to it while being pressed from above by press screw rings 106 and 107.

However, the aberration of the above-described optical element holding structure might change in response to a change in, for example, ambient temperature because the optical elements and constituent elements deform depending upon the temperature. This especially applies to an exposure apparatus using a light source with a relatively short wavelength. The exposure apparatus has optical elements made of glass materials such as quartz or fluorite, which have thermal expansion coefficients different from those of the materials of members for holding these optical elements. These optical elements and members cannot expand and contract free from any influence from each other. Consequently, the optical surfaces of these optical elements largely deform depending upon, for example, the ambient temperature. The deformation attributed to the temperature has a significant adverse influence on the aberration of the optical system.

A plurality of second holding members 105 are normally stacked on each other in the axial direction. As the second holding members 105 receive external forces upon being stacked and connected or due to other factors, the first holding members 103 and 104 which hold the optical elements receive external forces from, for example, the press screw rings 106 and 107. This deforms the optical surfaces of the optical elements, resulting in deterioration in the performance of the optical system.

To solve this problem, Japanese Patent Laid-Open No. 2001-343576 discloses an optical element holding structure which reduces deformation of the optical surface of an optical element due to, for example, an external force or a change in ambient temperature.

FIG. 7 conceptually shows an optical element holding structure to which Japanese Patent Laid-Open No. 2001-343576 is applied.

Referring to FIG. 7, a first holding member 112 holds a lens 111 as one of optical elements, and is made of a material having nearly the same thermal expansion coefficient as that of the lens 111. The lens 111 is fixed to the first holding member 112 by bonding.

A second holding member 113 coaxially holds the lens 111 and is made of a material having a thermal expansion coefficient different from that of the material of the first holding member 112. A plurality of notches are formed in circumferential portions of the first holding member 112. Elastic members 114 which form plate-like springs are inserted in these portions. The two ends of the elastic member 114 are connected to the first holding member 112, while its middle portion is connected to the second holding member 113. With this holding structure, the elastic member 114 has a low elasticity with respect to the optical element in the radial direction.

In this optical element holding structure, when the ambient temperature changes, the first holding member 112 and second holding member 113 expand or contract in different ways because they have different thermal expansion coefficients. Since the difference in thermal expansion is absorbed by bending deformation of the plate-like spring of the elastic member 114, the first holding member 112 can almost freely expand or contract.

Because the lens 111 and the first holding member 112 surrounding it have substantially the same thermal expansion coefficient, the lens 111 can deform by nearly simple expansion or simple contraction. This makes it possible to suppress any surface deformation, which may deteriorate the optical performance of the optical system.

Both the first holding member 112 and second holding member 113 are held through the elastic member 114 without being in direct contact with each other in the axial direction and radial direction. With this arrangement, deformation of the second holding member 113 due to an external force or its own weight is not directly transmitted to the first holding member 112, thereby suppressing deformation of the surface of the lens 111 upon deformation of the first holding member 112.

Unfortunately, the optical element holding structure in the above-described Japanese Patent Laid-Open No. 2001-343576 poses the following problem. That is, when the second holding member 113 deforms upon being pressed from its outer side in the radial direction, the first holding member 112 which holds the optical element 111 moves eccentrically.

FIG. 8 shows the optical element holding structure in Japanese Patent Laid-Open No. 2001-343576 when viewed from the optical axis direction of the optical element.

Reference numerals 111 to 114 as in FIG. 7 denote the same members in FIG. 8. The elastic members 114 are arranged at three points on the circumference of the first holding member 112 at an interval of 120°, and indicated by 114a, 114b, and 114c counterclockwise from the upper right member in FIG. 8. As shown in FIG. 8, assuming an arbitrary point on the optical axis of the lens 111 as the origin, an x-y-x orthogonal coordinate system in which the optical axis is the z-axis, and an r-θ-z cylindrical coordinate system in which the x-axis is θ=0 are set. Furthermore, a component of the elastic constant of the elastic member 114 on the r-θ-z coordinate system is indicated by (Kr, Kθ, Kz), and the three elastic members 114a, 114b, and 114c are assumed to have the same elastic constant.

Consider a case in which the second holding member 113 in the optical element holding structure shown in FIG. 8 has deformed into an elliptical shape upon being squeezed in the y direction as indicated by a broken line in FIG. 8 due to, for example, an external force.

Let Ky be the y component of the elastic constant of each of the elastic members 114a, 114b, and 114c. Then, the elastic member 114c satisfies Ky=Kr, and the elastic members 114a and 114b satisfy:

$$Ky = Kr \cdot \sin 30° + K\theta \cdot \cos 30° = (1/2) Kr + (\sqrt{3}/2) K\theta$$

The sum of the y components of the elastic constants of the elastic members 114a and 114b on the plus side of the y-axis with respect to the x-axis in FIG. 8 is $Kr + \sqrt{3} K\theta$, which is larger than the y component Kr of the elastic constant of the elastic member 114c on the minus side of the y-axis. Especially this optical element holding structure has a low elasticity in the radial direction, as described above. That is, since $Kr < K\theta$, the difference between the y components of the elastic constants of the elastic members 114 on the plus side and minus side of the y-axis is relatively large. The elastic members 114 deform upon deformation of the second holding member 113 such that the y component of deformation of the elastic member 114c upon deformation of the second holding member 113 is larger than the overall y component of deformation of the elastic members 114a and 114b upon deformation of the second holding member 113. Then, the first holding member 112 connected to the elastic members 114 eccentrically moves in the minus direction of the y-axis relative to the second holding member 113. At the same time, the optical element 111 held by the first holding member 112 also eccentrically moves.

As described above, the optical element holding structure in Japanese Patent Laid-Open No. 2001-343576 poses the following problem. That is, when the second holding member 113 deforms upon being pressed from its outer side in the radial direction, the optical element 111 moves eccentrically. This results in deterioration in the optical performance of the optical system including the optical element holding structure.

SUMMARY OF THE INVENTION

The present invention has been made in consideration of the above-described problem, and has as its object to attain an optical element holding structure which suppresses eccentric movement of an optical element due to an external force to decrease a change in aberration, thereby obtaining a high resolving power.

In order to solve the above-described problem and to achieve the object, according to the present invention, there is provided an optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged in a circumferential direction about an optical axis of the optical element as the center, and a phase of the plurality of first elastic members is shifted from a phase of the plurality of second elastic members in the circumferential direction about the optical axis of the optical element as the center.

Also, according to the present invention, there is provided an exposure apparatus including an illumination optical system adapted to illuminate a pattern of an original, and a projection optical system adapted to guide light from the original to a substrate and expose the substrate, at least one of the illumination optical system and the projection optical system including an optical element held using an optical element holding structure, the optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged in a circumferential direction about an optical axis of the optical element as the center, and a phase of the plurality of first elastic members is shifted from a phase of the plurality of second elastic members in the circumferential direction about the optical axis of the optical element as the center.

Also, according to the present invention, there is provided a device manufacturing method comprising the steps of: exposing a substrate using an exposure apparatus including an illumination optical system adapted to illuminate a pattern of an original, and a projection optical system adapted to guide light from the original to a substrate and expose the substrate; and developing the exposed substrate, the exposure apparatus including an optical element holding structure adapted to hold an optical element included in at least one of the illumination optical system and the projection optical system, the optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged in a circumferential direction about an optical axis of the optical element as the center, and a phase of the plurality of first elastic members is shifted from a phase of the plurality of second elastic members in the circumferential direction about the optical axis of the optical element as the center.

Also, according to the present invention, there is provided an optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged at an equal interval in a circumferential direction about an optical axis of the optical element as the center, and a phase of the plurality of first elastic members is equal to a phase of the plurality of second elastic members in the circumferential direction about the optical axis of the optical element as the center.

Also, according to the present invention, there is provided an exposure apparatus including an illumination optical system adapted to illuminate a pattern of an original, and a projection optical system adapted to guide light from the original to a substrate and expose the substrate, at least one of the illumination optical system and the projection optical system including an optical element held using an optical element holding structure, the optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged at an equal interval in a circumferential direction about an optical axis of the optical element as the center, and a phase of the plurality of first elastic members is equal to a phase of the plurality of second elastic members in the circumferential direction about the optical axis of the optical element as the center.

Also, according to the present invention, there is provided a device manufacturing method comprising the steps of: exposing a substrate using an exposure apparatus including an illumination optical system adapted to illuminate a pattern of an original, and a projection optical system adapted to guide light from the original to a substrate and expose the substrate; and developing the exposed substrate, the exposure apparatus including an optical element holding structure adapted to hold an optical element included in at least one of the illumination optical system and the projection optical system, the optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged at an equal interval in a circumferential direction about an optical axis of the optical element as the center, and a phase of the plurality of first elastic members is equal to a phase of the plurality of second elastic members in the circumferential direction about the optical axis of the optical element as the center.

Also, according to the present invention, there is provided an optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged at an equal interval in a circumferential direction of the optical element, and a phase of the plurality of first elastic members is equal to a phase of the plurality of second elastic members in the circumferential direction of the optical element.

Also, according to the present invention, there is provided an exposure apparatus including an illumination optical system adapted to illuminate a pattern of an original, and a projection optical system adapted to guide light from the original to a substrate and expose the substrate, at least one of the illumination optical system and the projection optical system including an optical element held using an optical element holding structure, the optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged at an equal interval in a circumferential direction of the optical element, and a phase of the plurality of first elastic members is equal to a phase of the plurality of second elastic members in the circumferential direction of the optical element.

Also, according to the present invention, there is provided a device manufacturing method comprising the steps of: exposing a substrate using an exposure apparatus including an illumination optical system adapted to illuminate a pattern of an original, and a projection optical system adapted to guide light from the original to a substrate and expose the substrate; and developing the exposed substrate, the exposure apparatus including an optical element holding structure adapted to hold an optical element included in at least one of the illumination optical system and the projection optical system, the optical element holding structure comprising: a first holding member adapted to hold an optical element; a second holding member which is positioned on an outer diameter side of the first holding member and adapted to hold the first holding member; a third holding member which is positioned on an outer diameter side of the second holding member and adapted to hold the second holding member; a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged at an equal interval in a circumferential direction of the optical element, and a phase of the plurality of first elastic members is equal to a phase of the plurality of second elastic members in the circumferential direction of the optical element.

According to the present invention, it is possible to attain an optical element holding structure which suppresses eccentric movement of an optical element due to an external force to decrease a change in aberration, thereby obtaining a high resolving power.

Further features of the present invention will become apparent from the following description of exemplary embodiments (with reference to the attached drawings).

DESCRIPTION OF THE EMBODIMENT

The best mode for carrying out the present invention will be described in detail below with reference to the accompanying drawings.

An embodiment to be described hereinafter is an implementation example of the present invention and can be appropriately modified or changed in accordance with various conditions and the arrangement of an apparatus to which the present invention is applied. Therefore, the present invention is not particularly limited to the following embodiment.

Figure 1:
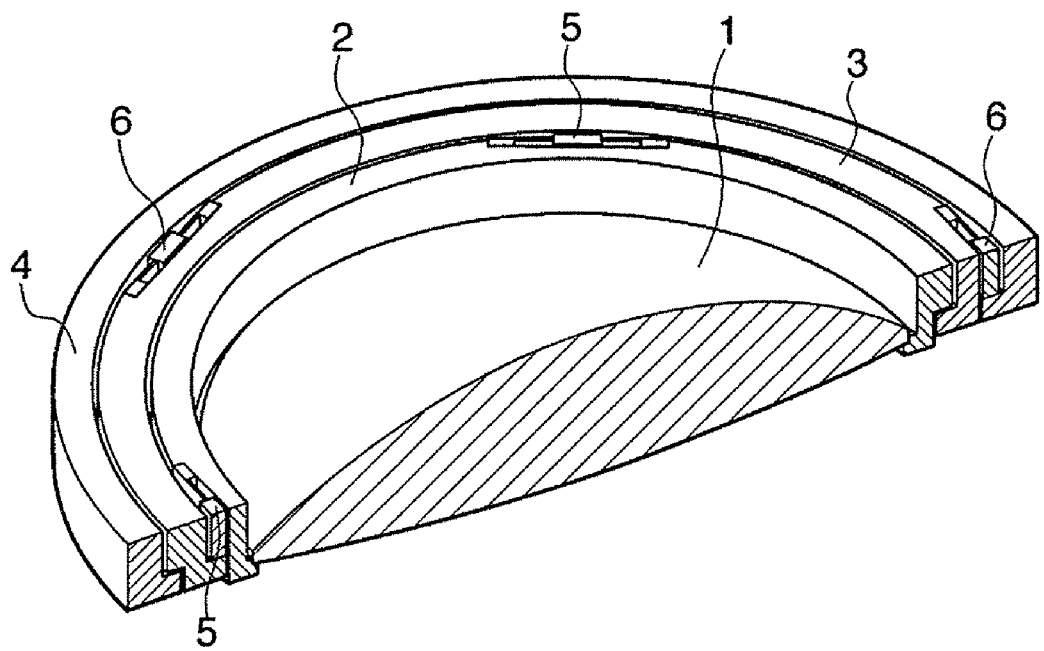
FIG. 1 shows an optical element holding structure according to an embodiment of the present invention.

FIG. 1 shows an optical element holding structure according to an embodiment of the present invention, and shows a half of an optical element from the center of its optical surface.

Referring to FIG. 1, a first holding member 2 holds an optical element 1 such as a lens or mirror. The optical element 1 is fixed to the first holding member 2 by bonding. A ring-like second holding member 3 is arranged on the outer circumferential side of the first holding member 2. A ring-like third holding member 4 is arranged on the outer circumferential side of the second holding member 3.

A plurality of notches are formed in circumferential portions of the first holding member 2. First elastic members 5 which can deform elastically and form plate-like springs are inserted in these portions. The two ends of the first elastic member 5 are connected to the first holding member 2, while its middle portion is connected to the second holding member 3.

A plurality of notches are formed in circumferential portions of the second holding member 3. Second elastic members 6 which can deform elastically and form plate-like springs are inserted in these portions. The two ends of the second elastic member 6 are connected to the second holding member 3, while its middle portion is connected to the third holding member 4.

Figure 2:
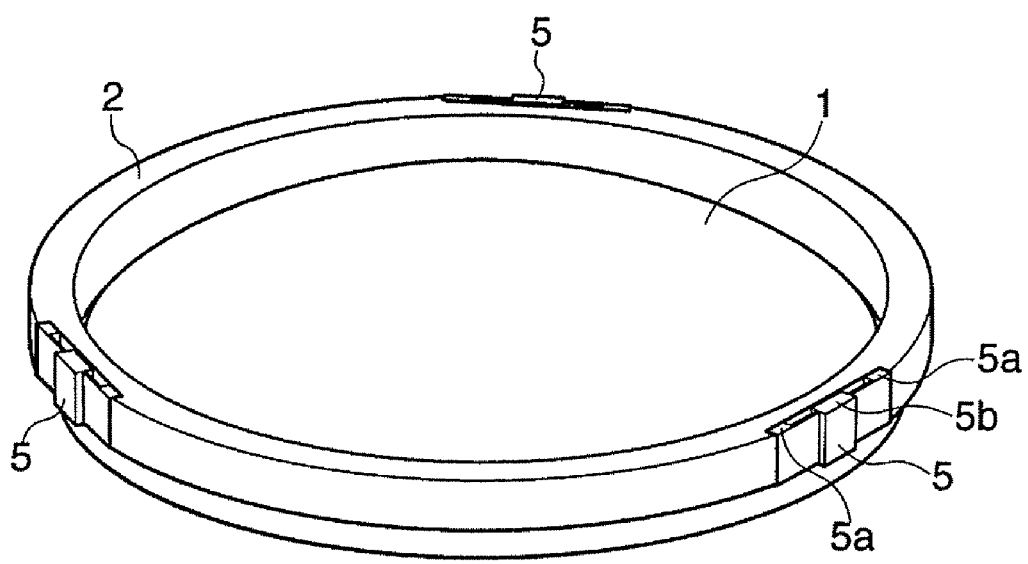
FIG. 2 shows part of the optical element holding structure shown in FIG. 1.

FIG. 2 shows part of the optical element holding structure shown in FIG. 1, and shows the state in which the first elastic members 5 are attached to the first holding member 2.

As shown in FIG. 2, the plurality of first elastic members 5 are inserted in circumferential portions of the first holding member 2 at a substantially equal angular pitch. The first elastic member 5 is threadably connected to the first holding member 2 at two ends 5a on its inner diameter side. In addition, the first elastic member 5 is threadably connected to the second holding member 3 at a middle position 5b on its outer diameter side.

Figure 3:
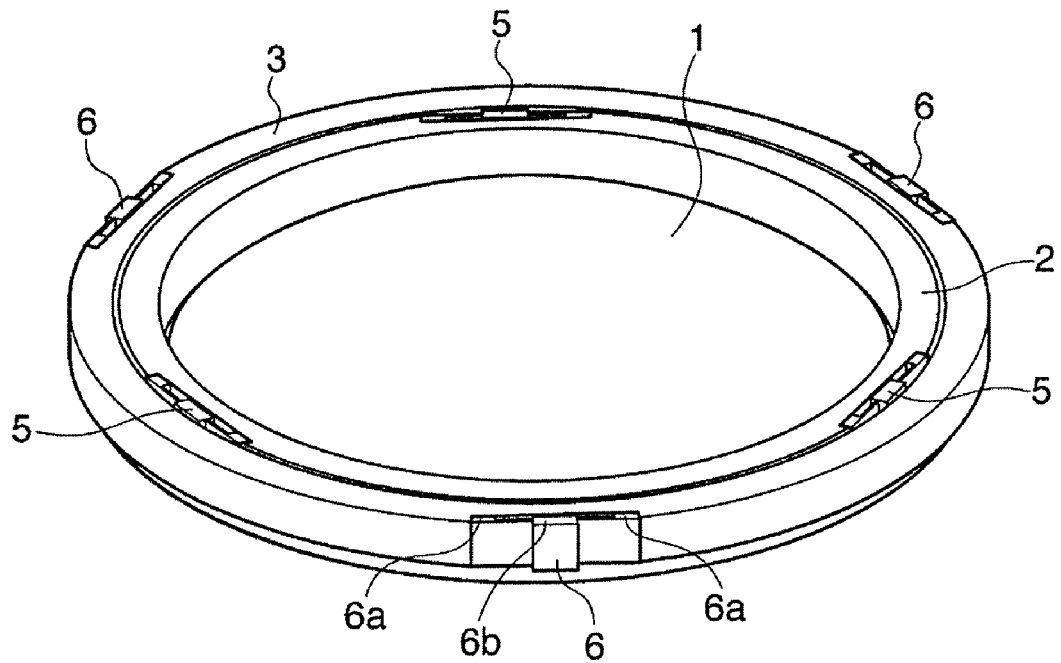
FIG. 3 shows part of the optical element holding structure shown in FIG. 1.

FIG. 3 shows the state in which the second elastic members 6 are attached to the second holding member 3.

As shown in FIG. 3, the plurality of second elastic members 6 are inserted in circumferential portions of the second holding member 3 at a substantially equal angular pitch. The second elastic member 6 is threadably connected to the second holding member 3 at two ends 6a on its inner diameter side. In addition, the second elastic member 6 is threadably connected to the third holding member 4 at a middle position 6b on its outer diameter side.

The first elastic members 5 and second elastic members 6 are equal in number and alternately arranged at an almost equal interval in the circumferential direction about the optical axis of the optical element 1 as the center.

Assume a case in which the third holding member 4 in the above-described optical element holding structure has deformed as the third holding member 4 is pressed from its outer side in the radial direction.

Figure 4:
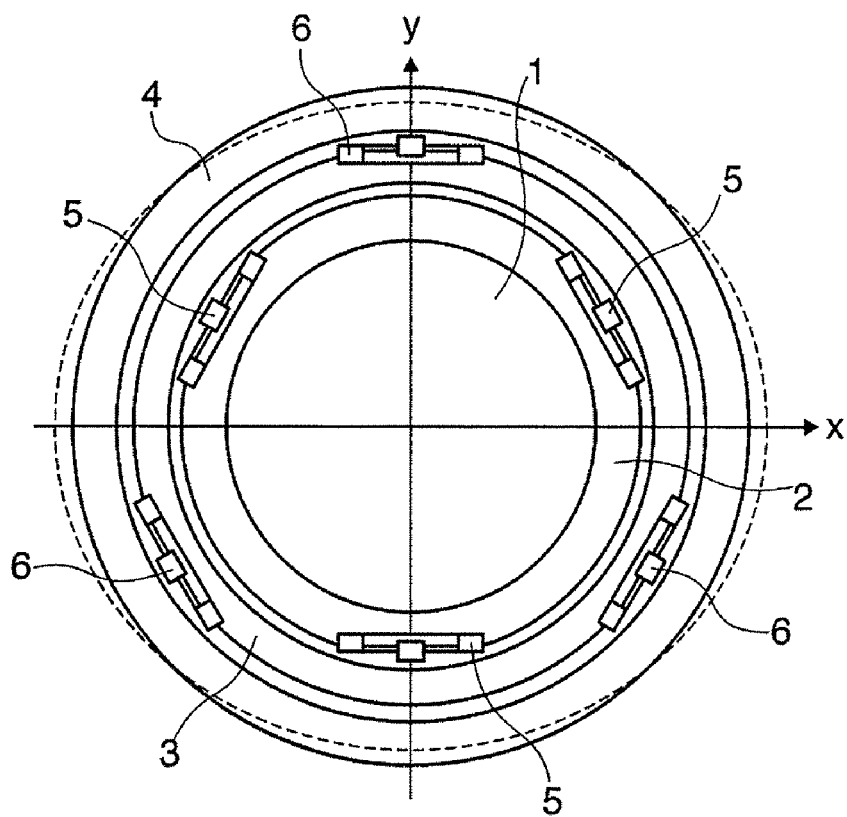
FIG. 4 shows the optical element holding structure according to this embodiment when seen from the optical axis side of an optical element.

FIG. 4 shows the optical element holding structure according to this embodiment when seen from the optical axis side of the optical element 1.

Referring to FIG. 4, both the first elastic members 5 and second elastic members 6 are arranged at three points on the circumferences of the first holding member 2 and second holding member 3 at an interval of about 120°. The phase of the first elastic members 5 is shifted from that of the second elastic members 6 in the circumferential direction about the optical axis as the center at an interval of about 60°. Assuming an arbitrary point on the optical axis of the optical element 1 as the origin, an x-y-z orthogonal coordinate system in which the optical axis is the z-axis is set.

Also referring to FIG. 4, when the third holding member 4 has deformed into an elliptical shape upon being squeezed in the y direction as indicated by a broken line in FIG. 4 due to, for example, an external force, the second elastic members 6 deform upon deformation of the third holding member 4. In this case, the sum of the y components of the elastic constants of the second elastic members 6 on the minus side of the y-axis with respect to the x-axis in FIG. 4 is larger than the y-component of the elastic constant of the second elastic member 6 on the plus side of the y-axis, as in the optical element holding structure of Japanese Patent Laid-Open No. 2001-343576. For this reason, the y component of deformation of the second elastic member 6 on the plus side of the y-axis is larger than the overall y component of deformation of the second elastic members 6 on the minus side of the y-axis. Then, the second holding member 3 connected to the second elastic members 6 eccentrically moves in the plus direction of the y-axis relative to the third holding member 4.

The second holding member 3 eccentrically moves depending on the difference between the y components of deformation of the second elastic members 6, and receives squeezing forces in the y direction from the second elastic members 6. Since the second holding member 3 has a hollow ring-like shape, it has low rigidities in the x and y directions as compared with that of the first holding member 2 which holds the optical element 1 on its inner diameter side. Therefore, the second holding member 3 deforms due to the forces from the second elastic members 6 upon being squeezed in the y direction.

As the second holding member 3 deforms, the first elastic member 5 deforms. At this time, the sum of the y components of the elastic constants of the first elastic members 5 on the plus side of the y-axis with respect to the x-axis in FIG. 4 is larger than the y component of the elastic constant of the first elastic member 5 on the minus side of the y-axis, as in the optical element holding structure of the above-described Japanese Patent Laid-Open No. 2001-343576. For this reason, the y component of deformation of the first elastic members 5 on the minus side of the y-axis is larger than the overall y component of deformation of the first elastic member 5 on the plus side of the y-axis. Then, the first holding member 2 connected to the first elastic members 5 eccentrically moves in the minus direction of the y-axis relative to the second holding member 3.

As the third holding member 4 deforms upon being pressed in the y direction, the second holding member 3 eccentrically moves in the plus direction of the y-axis relative to the third holding member 4, while the first holding member 2 eccentrically moves in the minus direction of the y-axis relative to the second holding member 3. Because the moving direction of the second holding member 3 is opposite that of the first holding member 2, their moving forces act to cancel each other so that the eccentric movement amount of the first holding member 2 relative to the third holding member 4 is smaller than in the optical element holding structure in Japanese Patent Laid-Open No. 2001-343576. Moreover, the amount of eccentric movement of the optical element 1 held by the first holding member 2 is decreased.

As described above, the optical element holding structure according to this embodiment can suppress eccentric movement of the optical element 1 when the third holding member 4 deforms in the radial direction.

The optical element holding structure according to this embodiment also can obtain an optical system in which deterioration in optical performance due to eccentric movement of an optical element hardly occurs even when the optical system which holds the optical element deforms in the radial direction.

[Exposure Apparatus]

Figure 5:
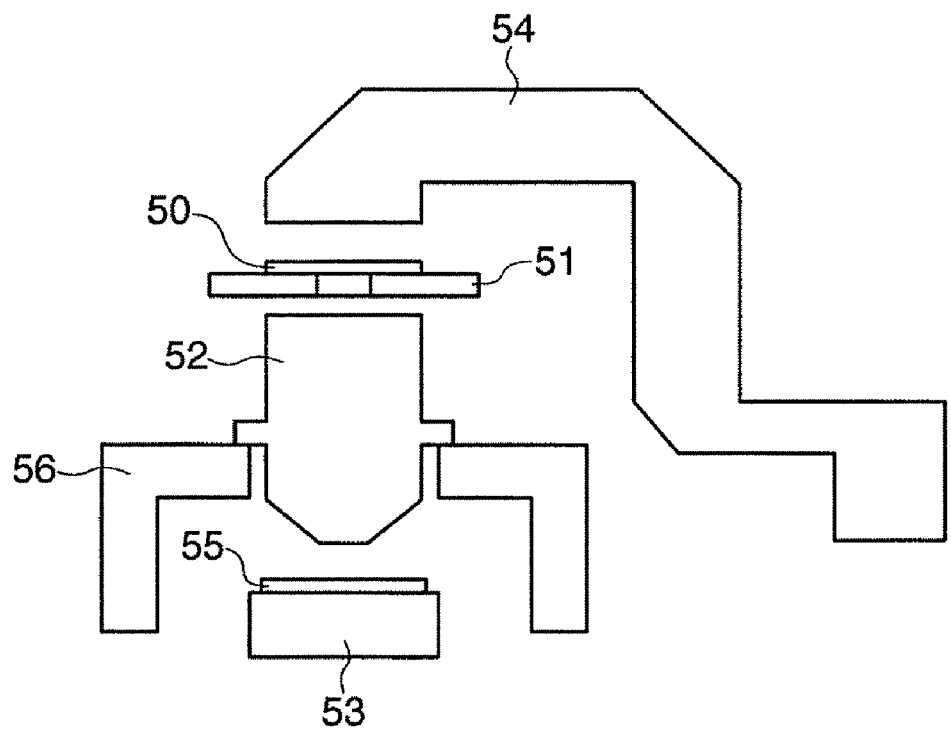
FIG. 5 shows an exposure apparatus to which the optical element holding structure according to the embodiment of the present invention is applied.
Figure 6:
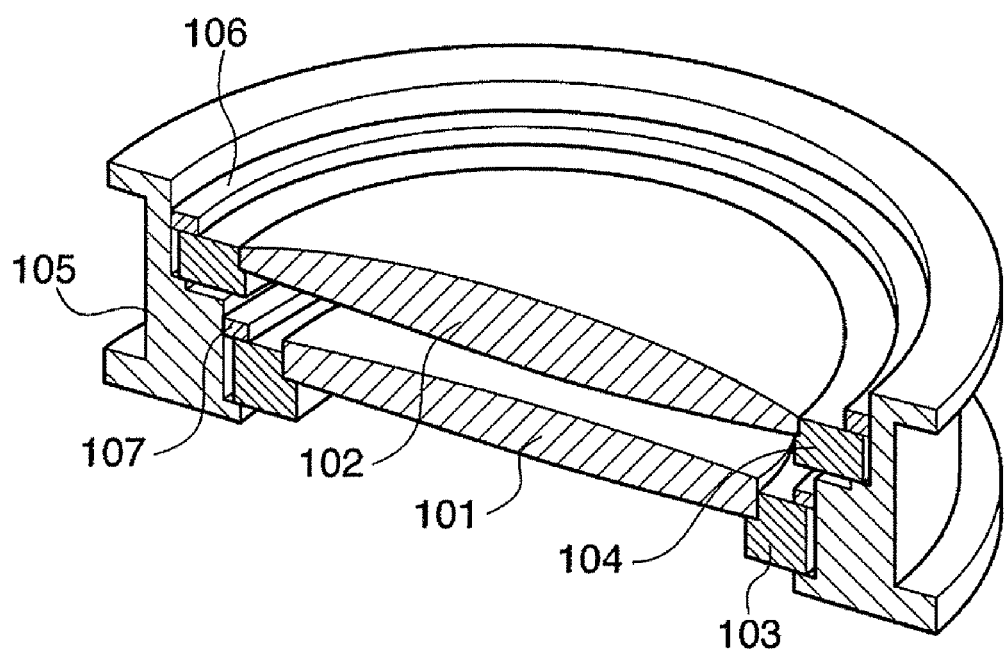
FIG. 6 shows the conventional optical element holding structure.
Figure 7:
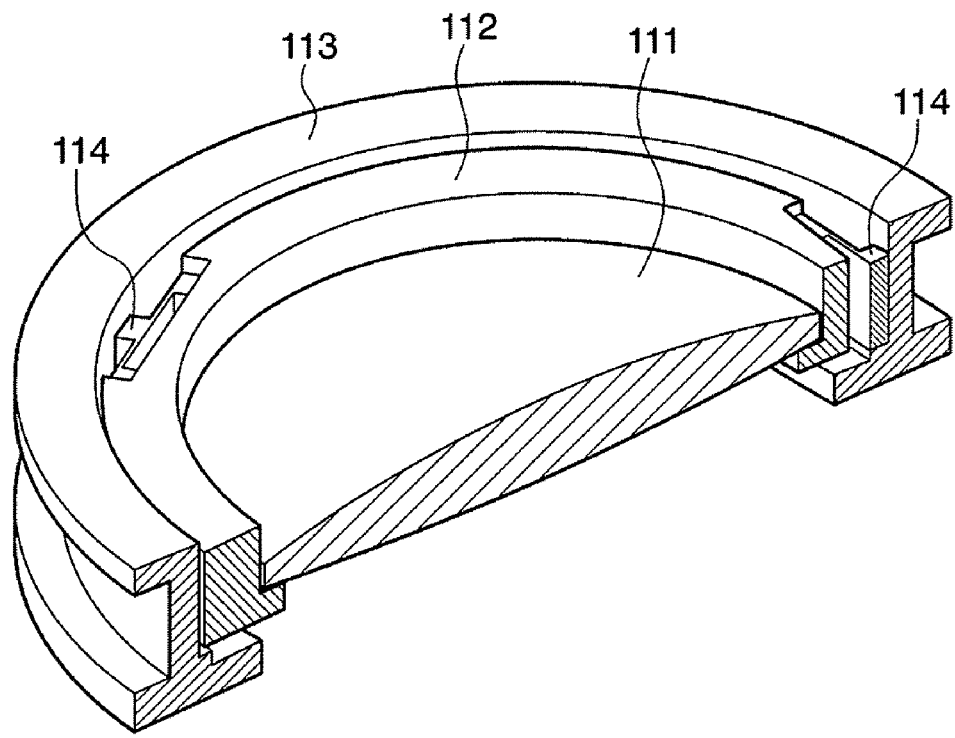
FIG. 7 shows an optical element holding structure in Japanese Patent Laid-Open No. 2001-343576.
Figure 8:
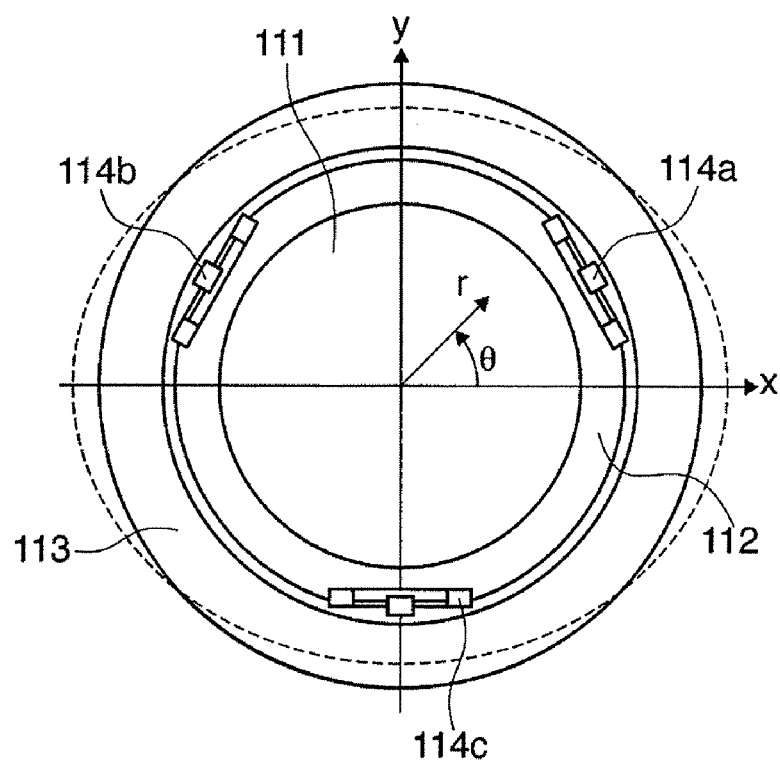
FIG. 8 shows the optical element holding structure in Japanese Patent Laid-Open No. 2001-343576 when seen from the optical axis side of an optical element.

FIG. 5 schematically shows an exposure apparatus to which the optical element holding structure according to the embodiment of the present invention is applied.

Referring to FIG. 5, a reticle 50 mounted on a reticle stage 51 is irradiated with exposure illumination light from an illumination optical system 54. The pattern of the reticle 50 is projected onto a wafer 55 mounted on a wafer stage 53 via a projection optical system 52 mounted on a frame 56 of the exposure apparatus, and is transferred onto the photosensitive agent on the wafer 55. To obtain a high-precision semiconductor product, the projection optical system 52 needs to have a sufficiently high resolving performance.

Holding an optical element of the projection optical system 52 by the optical element holding structure according to this embodiment makes it possible to obtain a high-performance exposure apparatus in which deterioration in optical performance due to eccentric movement of the optical element hardly occurs even when the projection optical system 52 deforms due to, for example, an external force from the frame 56.

The present invention is applicable to an illumination optical system, in addition to the above-described projection optical system.

It is possible to attain a high-performance exposure apparatus in which deterioration in optical performance due to eccentric movement of an optical element upon deformation due to an external force hardly occurs, thus manufacturing a high-quality semiconductor device.

[Device Manufacturing Method]

A process of manufacturing a semiconductor device using the exposure apparatus according to this embodiment will be explained next.

Devices (e.g., a semiconductor integrated circuit device and liquid crystal display device) are manufactured by a step of exposing a substrate using the exposure apparatus according to the above-described embodiment, a step of developing the substrate exposed in the exposing step, and other known steps of processing the substrate developed in the developing step.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-155726, filed Jun. 12, 2007, which is hereby incorporated by reference herein in its entirety.

What is claimed is:

1. An optical element holding structure comprising:
   a first holding member adapted to hold an optical element;
   a second holding member which is positioned on an outer diameter side of said first holding member and adapted to hold said first holding member;
   a third holding member which is positioned on an outer diameter side of said second holding member and adapted to hold said second holding member;
   a plurality of first elastic members which are positioned between said first holding member and said second holding member in a radial direction thereof, each of which has an inner diameter side connected to said first holding member, each of which has an outer diameter side connected to said second holding member, and which can elastically deform in the radial direction; and
   a plurality of second elastic members which are positioned between said second holding member and said third holding member in a radial direction thereof, each of which has an inner diameter side connected to said second holding member, each of which has an outer diameter side connected to said third holding member, and which can elastically deform in the radial direction,
   wherein said plurality of first elastic members and said plurality of second elastic members are arranged in a circumferential direction about an optical axis of the optical element as the center, and a phase of said plurality of first elastic members is shifted from a phase of said plurality of second elastic members in the circumferential direction about the optical axis of the optical element as the center.

2. The structure according to claim 1, wherein said first elastic members and said second elastic members are equal in number and alternately arranged in the circumferential direction about the optical axis of the optical element as the center.

3. The structure according to claim 2, wherein at least one of said first elastic members and said second elastic members are arranged at an equal interval in the circumferential direction about the optical axis of the optical element as the center.

4. The structure according to claim 2, wherein both of said first elastic members and said second elastic members are arranged at an equal interval in the circumferential direction about the optical axis of the optical element as the center.

5. The structure according to claim 4, wherein each of said second elastic members is inserted in the middle of adjacent two of said first elastic members.

6. The structure according to claim 4, wherein
   the number of said first elastic members and the number of said second elastic members are both three, and
   said first elastic members and said second elastic members are alternately arranged at an interval of 60°.

7. An exposure apparatus including an illumination optical system adapted to illuminate a pattern of an original, and a projection optical system adapted to guide light from the original to a substrate and expose the substrate,
   at least one of the illumination optical system and the projection optical system including an optical element held using an optical element holding structure,
   said optical element holding structure comprising:
   a first holding member adapted to hold an optical element;
   a second holding member which is positioned on an outer diameter side of said first holding member and adapted to hold said first holding member;
   a third holding member which is positioned on an outer diameter side of said second holding member and adapted to hold said second holding member;
   a plurality of first elastic members which are positioned between said first holding member and said second holding member in a radial direction thereof, each of which has an inner diameter side connected to said first holding member, each of which has an outer diameter side connected to said second holding member, and which can elastically deform in the radial direction; and
   a plurality of second elastic members which are positioned between said second holding member and said third holding member in a radial direction thereof, each of which has an inner diameter side connected to said second holding member, each of which has an outer diameter side connected to said third holding member, and which can elastically deform in the radial direction,
   wherein said plurality of first elastic members and said plurality of second elastic members are arranged in a circumferential direction about an optical axis of the optical element as the center, and a phase of said plurality of first elastic members is shifted from a phase of said plurality of second elastic members in the circumferential direction about the optical axis of the optical element as the center.

8. A device manufacturing method comprising the steps of:
   exposing a substrate using an exposure apparatus including an illumination optical system adapted to illuminate a pattern of an original, and a projection optical system adapted to guide light from the original to a substrate and expose the substrate; and
   developing the exposed substrate, the exposure apparatus including an optical element holding structure adapted to hold an optical element included in at least one of the illumination optical system and the projection optical system, the optical element holding structure comprising:

a first holding member adapted to hold an optical element;

a second holding member which is positioned on an outer diameter side of the first holding member and adapted to hold the first holding member;

a third holding member which is positioned on an outer diameter side of the second holding member and adapted to hold the second holding member;

a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein the plurality of first elastic members and the plurality of second elastic members are arranged in a circumferential direction about an optical axis of the optical element as the center, and a phase of the plurality of first elastic members is shifted from a phase of the plurality of second elastic members in the circumferential direction about the optical axis of the optical element as the center.

9. An optical element holding structure comprising:

a first holding member adapted to hold an optical element;

a second holding member which is positioned on an outer diameter side of said first holding member and adapted to hold said first holding member;

a third holding member which is positioned on an outer diameter side of said second holding member and adapted to hold said second holding member;

a plurality of first elastic members which are positioned between said first holding member and said second holding member in a radial direction thereof, each of which has an inner diameter side connected to said first holding member, each of which has an outer diameter side connected to said second holding member, and which can elastically deform in the radial direction; and a plurality of second elastic members which are positioned between said second holding member and said third holding member in a radial direction thereof, each of which has an inner diameter side connected to said second holding member, each of which has an outer diameter side connected to said third holding member, and which can elastically deform in the radial direction, wherein a phase of said plurality of first elastic members is shifted from a phase of said plurality of second elastic members in a circumferential direction about an optical axis of the optical element as the center and said plurality of first elastic members and said plurality of second elastic members are arranged at an equal interval in the circumferential direction about the optical axis of the optical element as the center.

10. An exposure apparatus including an illumination optical system adapted to illuminate a pattern of an original, and a projection optical system adapted to guide light from the original to a substrate and expose the substrate, at least one of the illumination optical system and the projection optical system including an optical element held using an optical element holding structure, said optical element holding structure comprising:

a first holding member adapted to hold an optical element;

a second holding member which is positioned on an outer diameter side of said first holding member and adapted to hold said first holding member;

a third holding member which is positioned on an outer diameter side of said second holding member and adapted to hold said second holding member;

a plurality of first elastic members which are positioned between said first holding member and said second holding member in a radial direction thereof, each of which has an inner diameter side connected to said first holding member, each of which has an outer diameter side connected to said second holding member, and which can elastically deform in the radial direction; and a plurality of second elastic members which are positioned between said second holding member and said third holding member in a radial direction thereof, each of which has an inner diameter side connected to said second holding member, each of which has an outer diameter side connected to said third holding member, and which can elastically deform in the radial direction, wherein a phase of said plurality of first elastic members is shifted from a phase of said plurality of second elastic members in a circumferential direction about an optical axis of the optical element as the center and said plurality of first elastic members and said plurality of second elastic members are arranged at an equal interval in the circumferential direction about the optical axis of the optical element as the center.

11. A device manufacturing method comprising the steps of:

exposing a substrate using an exposure apparatus including an illumination optical system adapted to illuminate a pattern of an original, and a projection optical system adapted to guide light from the original to a substrate and expose the substrate; and developing the exposed substrate, the exposure apparatus including an optical element holding structure adapted to hold an optical element included in at least one of the illumination optical system and the projection optical system, the optical element holding structure comprising:

a first holding member adapted to hold an optical element;

a second holding member which is positioned on an outer diameter side of the first holding member and adapted to hold the first holding member;

a third holding member which is positioned on an outer diameter side of the second holding member and adapted to hold the second holding member;

a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein a phase of said plurality of first elastic members is shifted from a phase of said plurality of second elastic members in a circumferential direction about an optical axis of the optical element as the center and said plurality of first elastic members and said plurality of second elastic members are arranged at an equal interval in the circumferential direction about the optical axis of the optical element as the center.

12. An optical element holding structure comprising:

a first holding member adapted to hold an optical element;

a second holding member which is positioned on an outer diameter side of said first holding member and adapted to hold said first holding member;

a third holding member which is positioned on an outer diameter side of said second holding member and adapted to hold said second holding member;

a plurality of first elastic members which are positioned between said first holding member and said second holding member in a radial direction thereof, each of which has an inner diameter side connected to said first holding member, each of which has an outer diameter side connected to said second holding member, and which can elastically deform in the radial direction; and a plurality of second elastic members which are positioned between said second holding member and said third holding member in a radial direction thereof, each of which has an inner diameter side connected to said second holding member, each of which has an outer diameter side connected to said third holding member, and which can elastically deform in the radial direction, wherein a phase of said plurality of first elastic members is shifted from a phase of said plurality of second elastic members in a circumferential direction of the optical element and said plurality of first elastic members and said plurality of second elastic members are arranged at an equal interval in the circumferential direction of the optical element.

13. An exposure apparatus including an illumination optical system adapted to illuminate a pattern of an original, and a projection optical system adapted to guide light from the original to a substrate and expose the substrate, at least one of the illumination optical system and the projection optical system including an optical element held using an optical element holding structure, said optical element holding structure comprising:

a first holding member adapted to hold an optical element;

a second holding member which is positioned on an outer diameter side of said first holding member and adapted to hold said first holding member;

a third holding member which is positioned on an outer diameter side of said second holding member and adapted to hold said second holding member;

a plurality of first elastic members which are positioned between said first holding member and said second holding member in a radial direction thereof, each of which has an inner diameter side connected to said first holding member, each of which has an outer diameter side connected to said second holding member, and which can elastically deform in the radial direction; and a plurality of second elastic members which are positioned between said second holding member and said third holding member in a radial direction thereof, each of which has an inner diameter side connected to said second holding member, each of which has an outer diameter side connected to said third holding member, and which can elastically deform in the radial direction, wherein a phase of said plurality of first elastic members is shifted from a phase of said plurality of second elastic members in a circumferential direction of the optical element and said plurality of first elastic members and said plurality of second elastic members are arranged at an equal interval in the circumferential direction of the optical element.

14. A device manufacturing method comprising the steps of:

exposing a substrate using an exposure apparatus including an illumination optical system adapted to illuminate a pattern of an original, and a projection optical system adapted to guide light from the original to a substrate and expose the substrate; and developing the exposed substrate, the exposure apparatus including an optical element holding structure adapted to hold an optical element included in at least one of the illumination optical system and the projection optical system, the optical element holding structure comprising:

a first holding member adapted to hold an optical element;

a second holding member which is positioned on an outer diameter side of the first holding member and adapted to hold the first holding member;

a third holding member which is positioned on an outer diameter side of the second holding member and adapted to hold the second holding member;

a plurality of first elastic members which are positioned between the first holding member and the second holding member in a radial direction thereof, each of which has an inner diameter side connected to the first holding member, each of which has an outer diameter side connected to the second holding member, and which can elastically deform in the radial direction; and a plurality of second elastic members which are positioned between the second holding member and the third holding member in a radial direction thereof, each of which has an inner diameter side connected to the second holding member, each of which has an outer diameter side connected to the third holding member, and which can elastically deform in the radial direction, wherein a phase of said plurality of first elastic members is shifted from a phase of said plurality of second elastic members in a circumferential direction of the optical element and said plurality of first elastic members and said plurality of second elastic members are arranged at an equal interval in the circumferential direction of the optical element.

* * * * *